(12) United States Patent
Nakao

(10) Patent No.: US 9,237,046 B2
(45) Date of Patent: Jan. 12, 2016

(54) RECEIVER CIRCUIT

(71) Applicant: FUJITSU LIMITED, Kawasaki-shi, Kanagawa (JP)

(72) Inventor: Takanori Nakao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/662,859

(22) Filed: Mar. 19, 2015

(65) Prior Publication Data

US 2015/0280948 A1 Oct. 1, 2015

(30) Foreign Application Priority Data

Mar. 27, 2014 (JP) .................. 2014-066302

(51) Int. Cl.
*H03K 5/159* (2006.01)
*H04L 25/08* (2006.01)
*H04L 25/03* (2006.01)
*H04L 7/00* (2006.01)
*H04L 27/01* (2006.01)

(52) U.S. Cl.
CPC ............ *H04L 25/08* (2013.01); *H04L 7/0058* (2013.01); *H04L 25/03057* (2013.01); *H04L 25/03885* (2013.01); *H04L 27/01* (2013.01); *H04L 2025/0349* (2013.01); *H04L 2025/03681* (2013.01)

(58) Field of Classification Search
CPC .................. H04L 25/03057; H04L 25/03885; H04L 2025/03681; H04L 2025/0349; H04L 27/01
USPC .......... 375/232, 233, 350, 348, 229, 346, 316
See application file for complete search history.

(56) References Cited

U.S. PATENT DOCUMENTS

| 8,503,519 | B2 | 8/2013 | Hidaka |
| 2009/0232196 | A1 | 9/2009 | Sunaga et al. |
| 2012/0207202 | A1 | 8/2012 | Hidaka |
| 2012/0207203 | A1 | 8/2012 | Hidaka |
| 2012/0207204 | A1 | 8/2012 | Hidaka |
| 2014/0064351 | A1* | 3/2014 | Hidaka ........................ 375/232 |

FOREIGN PATENT DOCUMENTS

| JP | 2009-225018 | 10/2009 |
| JP | 2012-170078 | 9/2012 |
| JP | 2012-170079 | 9/2012 |
| JP | 2012-170081 | 9/2012 |

* cited by examiner

*Primary Examiner* — Leila Malek
(74) *Attorney, Agent, or Firm* — Fujitsu Patent Center

(57) ABSTRACT

An n-tap (n≥2 (in the case of FIG. 1, n=2)) DFE equalizes a received signal on the basis of a determination result of a signal which has been received, and outputs a determination result of the received signal after equalization. An adjustment section generates a plurality of filter patterns for observation of an inter-symbol interference amount by changing values of n bits included in the plurality of filter patterns. The adjustment section then compares each of the plurality of filter patterns generated with an output data string corresponding to the determination result of the received signal after equalization and adjusts tap coefficients set for n (in the case of FIG. 1, 2) taps included in the DFE on the basis of adjustment values corresponding to values of the n bits included in a filter pattern which matches the output data string.

4 Claims, 10 Drawing Sheets

| FILTER PATTERN | $d_{-1}$ | $d_0$ | $d_1$ | $d_2$ | $d_3$ | $d_4$ | error | match | ADJUSTMENT VALUE OF $c_1$ | ADJUSTMENT VALUE OF $c_2$ |
|---|---|---|---|---|---|---|---|---|---|---|
| FP0 | 0 | 0 | 1 | 1 | 0 | 1 | 1 | 1 | +1 | +1 |
|  | 0 | 0 | 1 | 1 | 0 | 1 | 0 | 1 | -1 | -1 |
| FP1 | 0 | 0 | 1 | 0 | 0 | 1 | 1 | 1 | +1 | -1 |
|  | 0 | 0 | 1 | 0 | 0 | 1 | 0 | 1 | -1 | +1 |
| FP2 | 0 | 0 | 0 | 1 | 0 | 1 | 1 | 1 | -1 | +1 |
|  | 0 | 0 | 0 | 1 | 0 | 1 | 0 | 1 | +1 | -1 |
| FP3 | 0 | 0 | 0 | 0 | 0 | 1 | 1 | 1 | -1 | -1 |
|  | 0 | 0 | 0 | 0 | 0 | 1 | 0 | 1 | +1 | +1 |
|  |  |  |  |  |  |  |  | 0 | 0 | 0 |

FIG. 4

| FILTER PATTERN | $d_{-1}$ | $d_0$ | $d_1$ | $d_2$ | $d_3$ | $d_4$ | error | match | ADJUSTMENT VALUE OF $c_1$ |
|---|---|---|---|---|---|---|---|---|---|
| FPa0 | 0 | 0 | 1 | 1 | 0 | 1 | 1 | 1 | +1 |
|  |  |  |  |  |  |  | 0 | 1 | −1 |
| FPa1 | 0 | 0 | 0 | 1 | 0 | 1 | 1 | 1 | −1 |
|  |  |  |  |  |  |  | 0 | 1 | +1 |
|  |  |  |  |  |  |  |  | 0 | 0 |

| FILTER PATTERN | $d_{-1}$ | $d_0$ | $d_1$ | $d_2$ | $d_3$ | $d_4$ | error | match | ADJUSTMENT VALUE OF $c_2$ |
|---|---|---|---|---|---|---|---|---|---|
| FPb0 | 0 | 0 | 1 | 1 | 0 | 1 | 1 | 1 | +1 |
|  |  |  |  |  |  |  | 0 | 1 | −1 |
| FPb1 | 0 | 0 | 1 | 0 | 0 | 1 | 1 | 1 | −1 |
|  |  |  |  |  |  |  | 0 | 1 | +1 |
|  |  |  |  |  |  |  |  | 0 | 0 |

FIG. 6

| FILTER PATTERN | $d_{-1}$ | $d_0$ | $d_1$ | $d_2$ | ... | $d_n$ | error | match | ADJUSTMENT VALUE OF c1 | ADJUSTMENT VALUE OF c2 | ... | ADJUSTMENT VALUE OF cn |
|---|---|---|---|---|---|---|---|---|---|---|---|---|
| FP | 0 | 0 | C[n−1] | C[n−2] | ... | C[0] | 1 | 1 | C[n−1]=1: +1<br>C[n−1]=0: −1 | C[n−2]=1: +1<br>C[n−2]=0: −1 | ... | C[0]=1: +1<br>C[0]=0: −1 |
| | | | | | | | 0 | 1 | C[n−1]=1: −1<br>C[n−1]=0: +1 | C[n−2]=1: −1<br>C[n−2]=0: +1 | ... | C[0]=1: −1<br>C[0]=0: +1 |
| | | | | | | | | 0 | 0 | 0 | ... | 0 |

FIG. 9

RECEIVER CIRCUIT

CROSS-REFERENCE TO RELATED APPLICATION

This application is based upon and claims the benefit of priority of the prior Japanese Patent Application No. 2014-066302, filed on Mar. 27, 2014, the entire contents of which are incorporated herein by reference.

FIELD

The embodiments discussed herein are related to a receiver circuit.

BACKGROUND

With the improvement of the performance of information processors such as communication apparatus and servers, the speed at which signals are transmitted and received inside and outside the information processors has increased.

With the improvement of transmission speed, signal waveforms attenuate due to frequency-dependent loss. As a result, inter-symbol interference (ISI) occurs and bit error rates degrade. Accordingly, equalizers which suppress ISI are used in receiver circuits.

A decision feedback equalizer (DFE) which equalizes an input signal according to past data is one of equalizers which suppress ISI.

A DFE which generates two filter patterns that differ by only one bit, which determines the magnitude of ISI by finding the difference between received waveforms at the time of a received data string matching the two filter patterns, and which adjusts equalization intensity on the basis of the magnitude of the ISI is proposed. With this DFE the difference between two received waveforms which match the two filter patterns, at the time of data of a bit one bit after the bit by which the two filter patterns differ being received, is found. By doing so, the magnitude of ISI caused by the bit (by which the two filter patterns differ) one bit before this bit is observed.

U.S. Pat. No. 8,503,519
Japanese Laid-open Patent Publication No. 2012-170078
Japanese Laid-open Patent Publication No. 2012-170079
Japanese Laid-open Patent Publication No. 2012-170081
Japanese Laid-open Patent Publication No. 2009-225018

By the way, each tap in a DFE reproduces ISI during each unit interval (UI), so a plurality of taps are used for curbing the influence of ISI during plural UIs. In that case, a circuit which adjusts a tap coefficient (equalization coefficient) is arranged for each tap. This increases circuit area.

SUMMARY

According to an aspect, there is provided a receiver circuit including an n-tap ($n \geq 2$) decision feedback equalization section which equalizes a received signal on the basis of a determination result of a signal that has been received and which outputs a determination result of the received signal after equalization and an adjustment section which generates a plurality of filter patterns for observation of an inter-symbol interference amount by changing values of n bits included in the plurality of filter patterns, which compares each of the plurality of filter patterns generated with an output data string corresponding to the determination result of the received signal after equalization, and which adjusts tap coefficients set for n taps included in the decision feedback equalization section on the basis of adjustment values corresponding to values of the n bits included in a filter pattern which matches the output data string.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of adjusting tap coefficients;

FIG. 6 illustrates an example of adjusting a tap coefficient in the receiver circuit given as an example for comparison;

FIG. 9 illustrates an example of adjusting a tap coefficient; and

DESCRIPTION OF EMBODIMENTS

Figure 1:
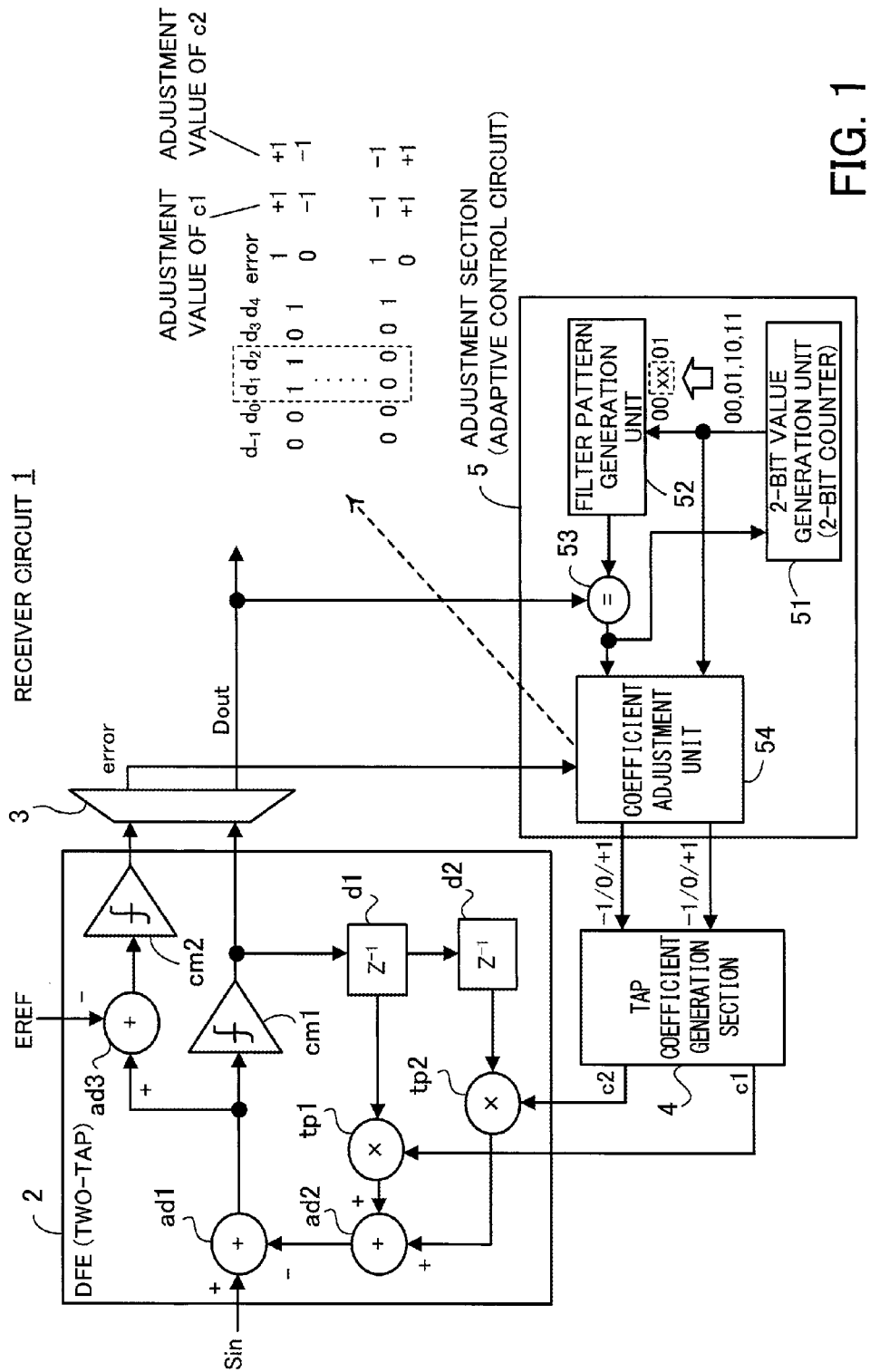
FIG. 1 illustrates an example of a receiver circuit according to a first embodiment.

Embodiments will now be described with reference to the accompanying drawings, wherein like reference numerals refer to like elements throughout.

First Embodiment

FIG. 1 illustrates an example of a receiver circuit according to a first embodiment.

A receiver circuit 1 according to a first embodiment includes a two-tap DFE 2, a demultiplexer 3, a tap coefficient generation section 4, and an adjustment section (adaptive control circuit) 5.

The DFE 2 equalizes a received signal on the basis of a determination result of signals which have been received, and outputs a determination result of a received signal after equalization. The DFE 2 includes adders ad1, ad2, and ad3, comparators cm1 and cm2, delay circuits d1 and d2, and taps (multipliers) tp1 and tp2.

The adder ad1 performs equalization by subtracting an output value from the adder ad2 from a received signal Sin. The adder ad2 adds output values from the taps tp1 and tp2. The adder ad3 outputs a value obtained by subtracting reference voltage EREF from a received signal after the equalization. The reference voltage EREF is a voltage value used for determining whether the equalization is insufficient or excessive. For example, the reference voltage EREF is set to the average (average voltage) of received signals. A value of the reference voltage EREF is stored in, for example, a storage section (not illustrated) such as a register. An example of setting the reference voltage EREF will be described later (see FIGS. 2 and 3).

The comparator cm1 compares the received signal after the equalization with a determined threshold to determine whether the received signal after the equalization is 0 or 1.

The comparator cm2 compares output from the adder ad3 with, for example, 0. If the output from the adder ad3 is positive, then the comparator cm2 outputs 1. If the output from the adder ad3 is negative, then the comparator cm2 outputs 0.

The delay circuit d1 delays output from the comparator cm1 by one UI. The delay circuit d2 further delays by one UI the output from the comparator cm1 delayed by the delay circuit d1.

The tap tp1 multiplies the output from the comparator cm1 delayed by one UI by the delay circuit d1 by a tap coefficient c1 generated by the tap coefficient generation section 4. By doing so, the amount of ISI caused by a value of a bit during a UI one UI before the current UI is reproduced. The tap tp2 multiplies the output from the comparator cm1 delayed by two UIs by the delay circuits d1 and d2 by a tap coefficient c2 generated by the tap coefficient generation section 4. By doing so, the amount of ISI caused by a value of a bit during a UI two UIs before the current UI is reproduced.

The demultiplexer 3 converts serial data outputted during each UI from the comparator cm1 to an output data string Dout which is parallel data. Furthermore, the demultiplexer 3 outputs output from the comparator cm2 as, for example, a 1-bit error signal error.

The tap coefficient generation section 4 generates the tap coefficients c1 and c2 set for the taps tp1 and tp2, respectively, on the basis of adjustment values (−1, 0, or +1) supplied from the adjustment section 5.

The adjustment section 5 adaptively controls the tap coefficients c1 and c2 during normal operation (data receiving) of the receiver circuit 1 on the basis of output from the DFE 2. Accordingly, the adjustment section 5 may also be referred to as an adaptive control circuit.

The adjustment section 5 generates plural filter patterns for observation of an ISI amount in each of which values of two bits are changed, and compares each filter pattern generated with an output data string Dout corresponding to a result of determination by the DFE 2. By using adjustment values (−1, 0, or +1, for example) corresponding to values of the two bits (variable bits) included in a filter pattern which matches the output data string Dout, the adjustment section 5 adjusts the tap coefficients c1 and c2 set in the taps tp1 and tp2 respectively.

The adjustment section 5 includes a 2-bit value generation unit 51, a filter pattern generation unit 52, a determination unit 53, and a coefficient adjustment unit 54.

The 2-bit value generation unit 51 generates a 2-bit value according to the number (=2) of the taps included in the DFE 2. Each time the determination unit determines that a filter pattern generated by the filter pattern generation unit 52 matches an output data string Dout outputted from the demultiplexer 3, the 2-bit value generation unit 51 outputs the next 2-bit value.

The 2-bit value generation unit 51 is, for example, a 2-bit counter. In that case, the 2-bit value generation unit 51 outputs 2-bit values in the order of 00, 01, 10, 11, 00, and so on.

The filter pattern generation unit 52 generates plural filter patterns for observation of an ISI amount each including a 2-bit value outputted from the 2-bit value generation unit 51. In the example of FIG. 1, the filter pattern generation unit 52 generates a 6-bit filter pattern including bits $d_{-1}$ through $d_4$. Of the filter pattern, the third bit $d_1$ and the fourth bit $d_2$ from the left are variable bits generated by the 2-bit value generation unit 51 and the other bits are fixed bits.

The determination unit 53 determines whether or not a filter pattern generated by the filter pattern generation unit 52 matches an output data string Dout outputted from the demultiplexer 3. For example, if the filter pattern generated by the filter pattern generation unit 52 matches the output data string Dout outputted from the demultiplexer 3, then the determination unit 53 outputs 1. If the filter pattern generated by the filter pattern generation unit 52 does not match the output data string Dout outputted from the demultiplexer 3, then the determination unit 53 outputs 0.

When a filter pattern generated by the filter pattern generation unit 52 matches an output data string Dout outputted from the demultiplexer 3, the coefficient adjustment unit 54 supplies to the tap coefficient generation section 4 adjustment amounts of the tap coefficients c1 and c2 according to an error signal error and the above 2-bit value.

As illustrated in FIG. 1, for example, when the two bits $d_1$ and $d_2$ are 1 and the error signal error is 1, the coefficient adjustment unit 54 increments (+1) both of the tap coefficients c1 and c2. Furthermore, when the two bits $d_1$ and $d_2$ are 0 and 1, respectively, and the error signal error is 0, the coefficient adjustment unit 54 increments the tap coefficient c1 and decrements (−1) the tap coefficient c2.

If a filter pattern generated by the filter pattern generation unit 52 differs from an output data string Dout outputted from the demultiplexer 3, then the coefficient adjustment unit 54 does not adjust the tap coefficient c1 or c2.

According to the above receiver circuit 1, the adjustment section 5 generates plural filter patterns for observation of an ISI amount in each of which two bits are variable, and compares each filter pattern with output from the DFE 2. The adjustment section 5 then adjusts the tap coefficients in block by the use of adjustment values corresponding to the two bits included in a filter pattern which matches the output from the DFE 2. As a result, there is no need to arrange adjustment circuits according to taps. This reduces circuit area.

An example of the operation of adjusting a tap coefficient in the DFE 2 of the receiver circuit 1 will now be described. An example of observing an ISI amount by the use of a filter pattern will be described first.

(Example of Observing ISI Amount by Using Filter Pattern)

Figure 2:
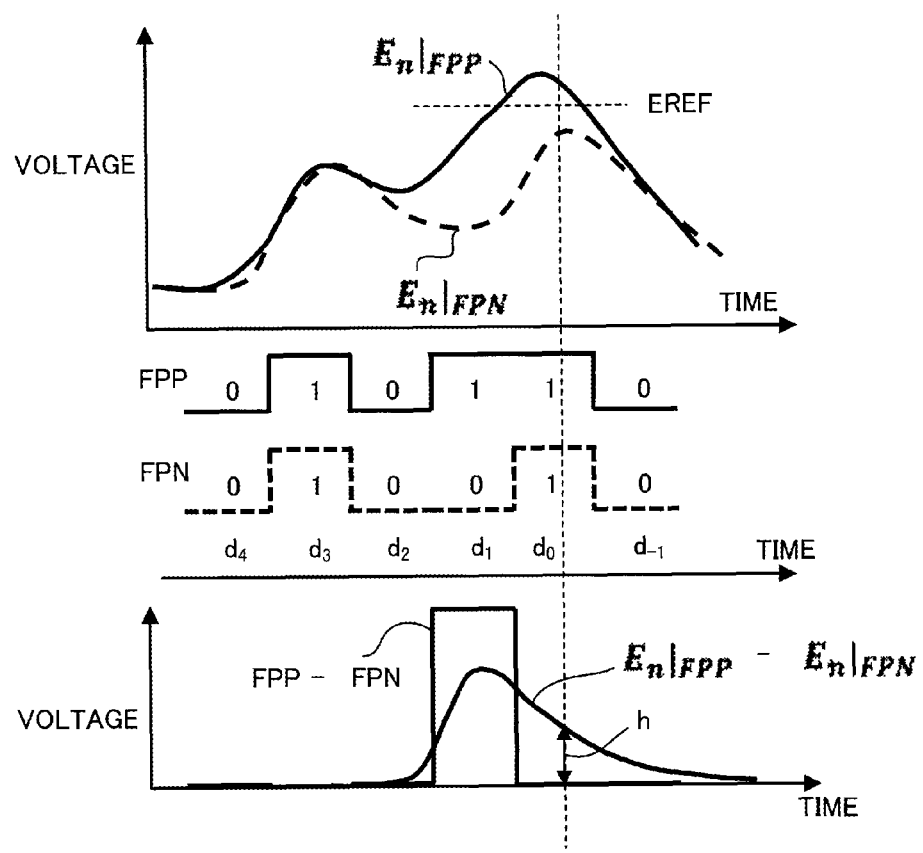
FIG. 2 illustrates an example of observing an ISI amount by the use of a filter pattern.

FIG. 2 illustrates an example of observing an ISI amount by the use of a filter pattern.

FIG. 2 illustrates received voltage $E_n|_{FPP}$ and received voltage $E_n|_{FPN}$ of a received signal Sin having a data pattern which matches two filter patterns FPP and FPN, respectively, that differ by only one bit, the differential between the received voltage $E_n|_{FPP}$ and the received voltage $E_n|_{FPN}$, and the differential between the filter patterns FPP and FPN. In FIG. 2, a horizontal axis indicates time and a vertical axis indicates voltage.

In the example of FIG. 2, the filter patterns FPP and FPN differ in value only of a bit $d_1$. A pulse response is calculated by finding the difference between voltages at the time of the filter patterns FPP and FPN matching the data pattern of the received signal Sin. Accordingly, by finding the difference between received voltages corresponding to a bit one bit after the bit $d_1$ of the filter patterns FPP and FPN, the magnitude of ISI (h in FIG. 2) caused by data of the bit $d_1$ is observed. By changing a bit in which the two filter patterns FPP and FPN differ in value, the magnitude of ISI in any position can be observed.

However, it is difficult in a circuit to find the difference between two voltage waveforms received at different times. Accordingly, the receiver circuit 1 according to the first embodiment does not directly find an ISI amount but determines by the use of reference voltage EREF, which is the average of received voltages, whether an ISI amount is positive or negative. A positive ISI amount means that equalization is insufficient. A negative ISI amount means that equalization is excessive.

Figure 3:
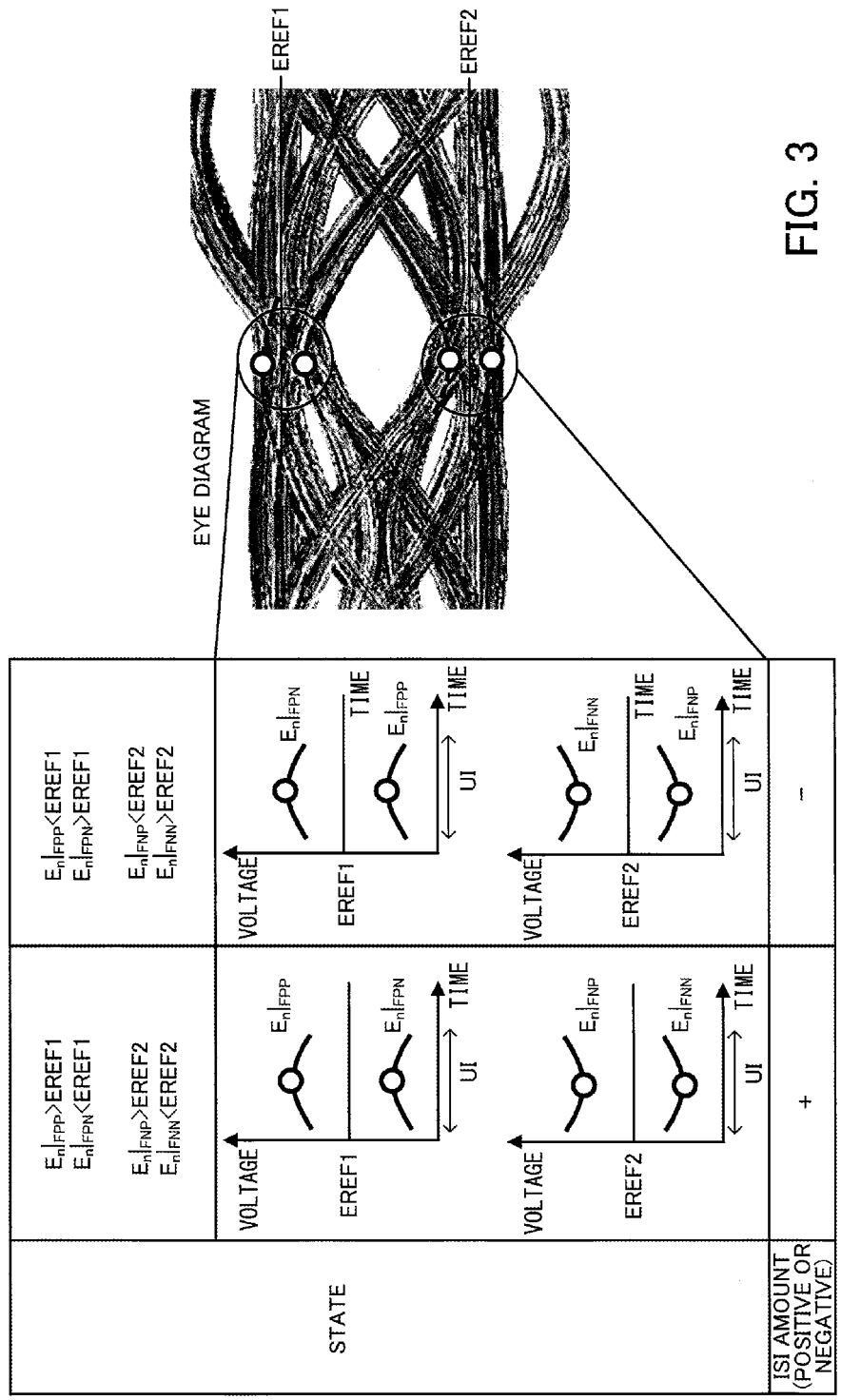
FIG. 3 illustrates an example of determining by the use of reference voltage EREF whether an ISI amount is positive or negative.

FIG. 3 illustrates an example of determining by the use of reference voltage EREF whether an ISI amount is positive or negative.

The voltage waveform of a received signal Sin having each data pattern is illustrated by an eye diagram. The average of voltages of a received signal Sin at a high (H) level is set as reference voltage EREF1 and the average of voltages of the received signal Sin at a low (L) level is set as reference voltage EREF2.

When a value of a bit (bit $d_0$, in the case of FIG. 1 or 2) of a filter pattern on the basis of which whether an ISI amount is positive or negative is determined is 1, the reference voltage EREF1 is used. When a value of the bit of the filter pattern on the basis of which whether an ISI amount is positive or negative is determined is 0, the reference voltage EREF2 is used.

Received voltage $E_n|_{FPP}$ indicates that a value of the bit on the basis of which whether an ISI amount is positive or negative is determined is 1 and that a value of the previous bit is also 1. Received voltage $E_n|_{FPN}$ indicates that a value of the bit on the basis of which whether an ISI amount is positive or negative is determined is 1 and that a value of the previous bit is 0. Received voltage $E_n|_{FPN}$ indicates that a value of the bit on the basis of which whether an ISI amount is positive or negative is determined is 0 and that a value of the previous bit is 1. Received voltage $E_n|_{FNN}$ indicates that a value of the bit on the basis of which whether an ISI amount is positive or negative is determined is 0 and that a value of the previous bit is also 0.

As illustrated in FIG. 3, whether an ISI amount is positive or negative during a UI is determined on the basis of whether the received voltage $E_n|_{FPP}$ or $E_n|_{FPN}$ is higher or lower than the reference voltage EREF1 during the UI or whether the received voltage $E_n|_{FNP}$ or $E_n|_{FNN}$ is higher or lower than the reference voltage EREF2 during the UI.

For example, $E_n|_{FPP}$>EREF1 indicates that voltage is higher than EREF1 due to the influence of ISI caused by the value (1) of the previous bit. Accordingly, an ISI amount is positive (+). $E_n|_{FPN}$<EREF1 indicates that voltage is lower than EREF1 due to the influence of ISI caused by the value (0) of the previous bit. Accordingly, an ISI amount is also positive (+).

$E_n|_{FNP}$>EREF2 indicates that voltage is higher than EREF2 due to the influence of ISI caused by the value (1) of the previous bit. Accordingly, an ISI amount is positive (+). $E_n|_{FNN}$<EREF2 indicates that voltage is lower than EREF2 due to the influence of ISI caused by the value (0) of the previous bit. Accordingly, an ISI amount is also positive (+).

These states in which an ISI amount is positive mean that equalization is insufficient.

On the other hand, when $E_n|_{FPP}$<EREF1, $E_n|_{FPN}$>EREF1, $E_n|_{FNP}$<EREF2, or $E_n|_{FNN}$>EREF2, an ISI amount is negative (−). The states in which an ISI amount is negative mean that equalization is excessive.

With the receiver circuit 1 according to the first embodiment the adder ad3 is used for determining, on the basis of whether a value obtained by subtracting reference voltage EREF from a received signal after equalization having a data pattern which matches a filter pattern is positive or negative, whether or not the equalization is insufficient. For example, when a data pattern of a received signal after equalization matches the filter pattern FPP illustrated in FIG. 2 and output from the adder ad3 is positive, an error signal error is 1. The coefficient adjustment unit 54 determines that the equalization is insufficient, and makes tap coefficients higher. When output from the adder ad3 is negative, the error signal error is 0. The coefficient adjustment unit 54 determines that the equalization is excessive, and makes tap coefficients lower.

An example of adjusting tap coefficients will now be described.

(Example of Adjusting Tap Coefficients)

FIG. 4 illustrates an example of adjusting tap coefficients.

In the example of FIG. 4, adjustment values of tap coefficients c1 and c2 corresponding to filter patterns FP0, FP1, FP2, and FP3, a value of an error signal error, and a result match of determination by the determination unit 53 are indicated.

Bits $d_1$ and $d_2$ of the filter patterns FP0 through FP3 are variable bits generated by the 2-bit value generation unit 51, and the other bits are fixed. Values in bits $d_0$ of the filter patterns FP0 through FP3 on the basis of which whether an ISI amount is positive or negative is determined are 0, so the reference voltage EREF2 illustrated in FIG. 3 is applied.

For example, when an output data string of a received signal Sin matches the filter pattern FP0, values of the bits $d_1$ and $d_2$ before the bit $d_0$ are 1. Accordingly, received voltage of the bit $d_0$ may be higher than the reference voltage EREF2. That is to say, a state in which the received voltage $E_n|_{FNP}$>EREF2 indicated in FIG. 3 may arise. In this case, a value obtained by subtracting the reference voltage EREF2 from a received signal after equalization is positive and the error signal error is 1. As illustrated in FIG. 4, at this time the coefficient adjustment unit 54 increments the tap coefficients c1 and c2 by 1 to increase equalization intensity.

On the other hand, when an output data string of the received signal Sin matches the filter pattern FP0 and received voltage of the bit $d_0$ is lower than the reference voltage EREF2, a value obtained by subtracting the reference voltage EREF2 from a received signal after equalization is negative and the error signal error is 0. This state is the same as the state of FIG. 3 in which received voltage $E_n|_{FNP}$<EREF 2, and means that the equalization is excessive. Accordingly, as illustrated in FIG. 4, the coefficient adjustment unit 54 decrements the tap coefficients c1 and c2 by 1 to decrease equalization intensity.

Similarly, as illustrated in FIG. 4, the coefficient adjustment unit 54 adjusts the tap coefficients c1 and c2 according to values of the bits $d_1$ and $d_2$ of the filter patterns FP1 through FP3 and a value of the error signal error.

Each time an output data string Dout matches a filter pattern (each time a determination result match becomes 1), the 2-bit value generation unit 51 outputs the next 2-bit value. As a result, a filter pattern is updated. When the 2-bit value generation unit 51 is a 2-bit counter, a filter pattern is updated in the order of FP3, FP2, FP1, and FP0. This enables equalization corresponding to plural data patterns.

When an output data string Dout matches no filter pattern (match=0), adjustment values of the tap coefficients c1 and c2 are 0 and an adjustment is not made.

As has been described, with the receiver circuit 1 the adjustment section 5 generates four filter patterns for observation of an ISI amount in each of which two bits are variable, and compares each filter pattern with an output data string Dout. The adjustment section 5 then adjusts tap coefficients in block by the use of adjustment values corresponding to the two bits included in a filter pattern which matches the output data string Dout. As a result, there is no need to arrange adjustment sections (adjustment circuits) according to taps, and circuit area is reduced.

An example of a receiver circuit in which adjustment sections are arranged according to taps will now be given for comparison.

(Example for Comparison)

Figure 5:
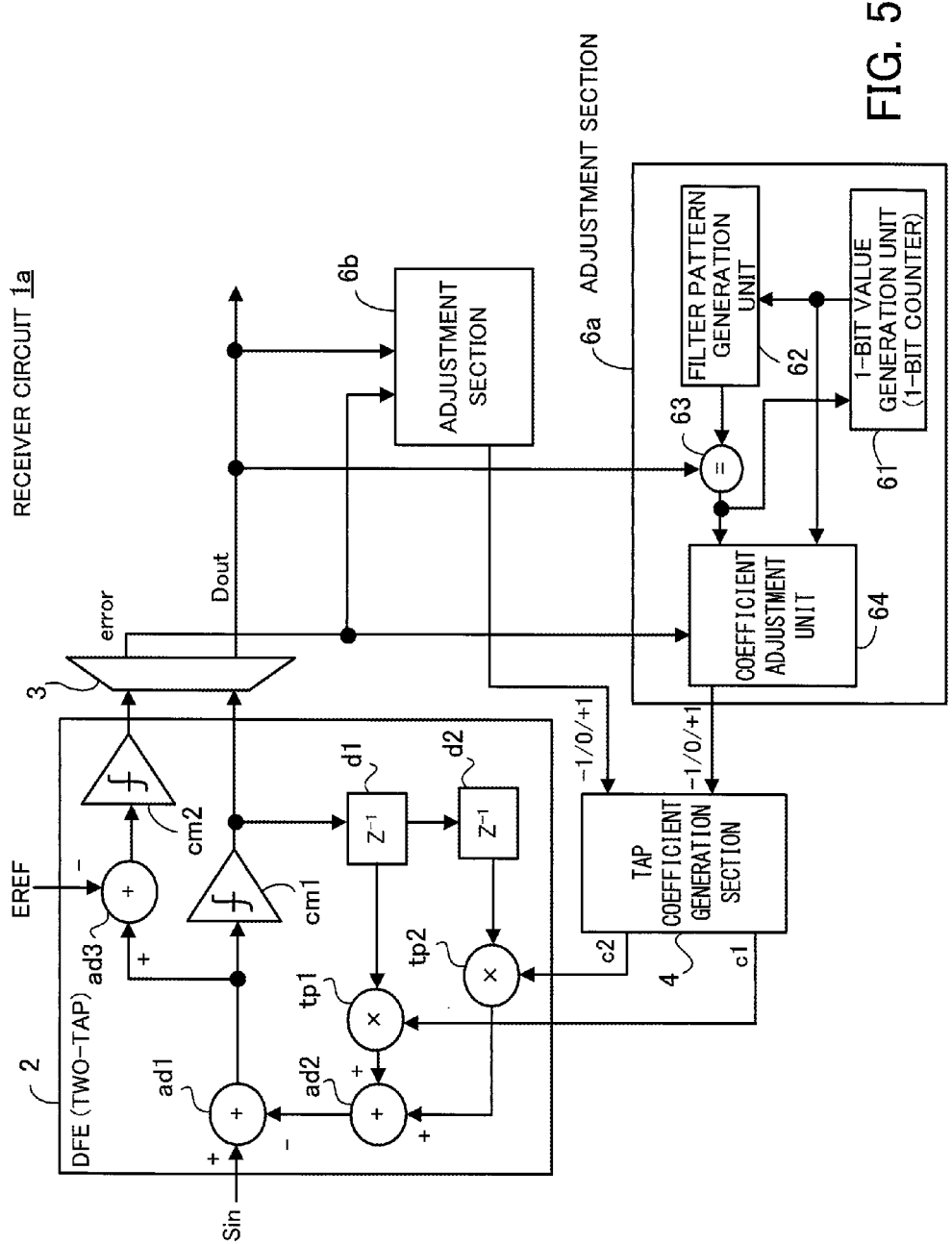
FIG. 5 illustrates an example of a receiver circuit in which adjustment sections are arranged according to taps.

FIG. 5 illustrates an example of a receiver circuit in which adjustment sections are arranged according to taps.

Components in a receiver circuit 1a of FIG. 5 which are the same as those in the receiver circuit 1 of FIG. 1 are marked with the same numerals.

The receiver circuit 1a includes adjustment sections 6a and 6b which adjust tap coefficients c1 and c2 of taps tp1 and tp2 respectively. For example, the adjustment section 6a which adjusts the tap coefficient c1 includes a 1-bit value generation unit 61, a filter pattern generation unit 62, a determination unit 63, and a coefficient adjustment unit 64. The 1-bit value generation unit 61 is, for example, a 1-bit counter.

The adjustment section 6b which adjusts the tap coefficient c2 includes the same components.

The 1-bit value generation unit 61 of the adjustment section 6a changes a value of a bit $d_1$ just before a bit $d_0$ of a filter pattern on the basis of which whether an ISI amount is positive or negative is determined. On the other hand, a 1-bit value generation unit (not illustrated) of the adjustment section 6b changes a value of a bit $d_2$ two bits before the bit $d_0$ of a filter pattern.

Each of the adjustment sections 6a and 6b generates a filter pattern on the basis of a 1-bit variable value, compares the filter pattern with an output data string Dout, and outputs an adjustment value of the tap coefficient c1 or c2 on the basis of a comparison result, an error signal error, and the 1-bit variable value.

FIG. 6 illustrates an example of adjusting a tap coefficient in the receiver circuit given as an example for comparison.

In the example of FIG. 6, adjustment values of the tap coefficients c1 and c2 corresponding to filter patterns FPa0 and FPa1 generated by the adjustment section 6a, filter patterns FPb0 and FPb1 generated by the adjustment section 6b, the error signal error, and a determination result match are indicated.

For example, when the filter pattern FPa0 generated by the adjustment section 6a matches an output data string Dout and the error signal error is 1, the adjustment section 6a increments the tap coefficient c1 by 1. When the error signal error is 0, the adjustment section 6a decrements the tap coefficient c1 by 1.

On the other hand, when the filter pattern FPb1 generated by the adjustment section 6b matches an output data string Dout and the error signal error is 1, the adjustment section 6b decrements the tap coefficient c2 by 1. When the error signal error is 0, the adjustment section 6b increments the tap coefficient c2 by 1.

As has been described, with the receiver circuit 1a given as an example for comparison, only one of the tap coefficients c1 and c2 is adjusted when an output data string Dout matches a specific filter pattern.

As illustrated in FIG. 4, on the other hand, with the receiver circuit 1 according to the first embodiment the one adjustment section 5 changes two bits of a filter pattern. As a result, when an output data string Dout matches a specific filter pattern, both of the tap coefficients c1 and c2 are adjusted in block. Accordingly, the adjustment sections 6a and 6b are arranged according to the taps in FIG. 5, but with the receiver circuit 1 according to the first embodiment there is no need to arrange adjustment sections according to the taps.

Figure 7:
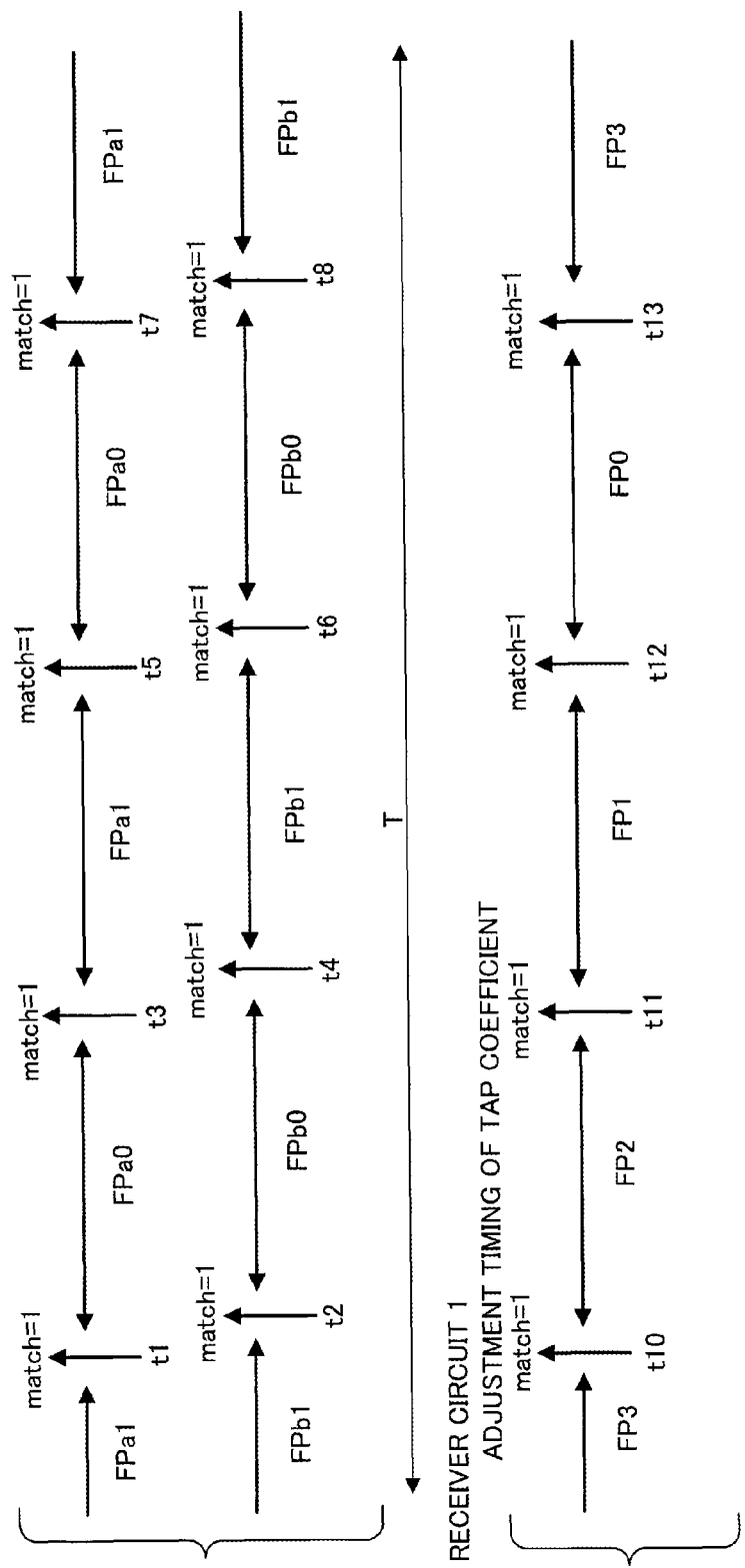
FIG. 7 illustrates an example of a comparison between adjustment timing of a tap coefficient (frequency of the update of equalization intensity) in the receiver circuit given as an example for comparison and adjustment timing of a tap coefficient in the receiver circuit according to the first embodiment.

FIG. 7 illustrates an example of a comparison between adjustment timing of a tap coefficient (frequency of the update of equalization intensity) in the receiver circuit given as an example for comparison and adjustment timing of a tap coefficient in the receiver circuit according to the first embodiment.

With the receiver circuit 1a, the adjustment section 6a generates the filter patterns FPa1 and FPa0 in order and compares each filter pattern with an output data string Dout. When the filter pattern FPa1 or FPa0 matches the output data string Dout, the adjustment section 6a adjusts the tap coefficient c1. At timing t1 or t5 the filter pattern FPa1 matches the output data string Dout. At timing t3 or t7 the filter pattern FPa0 matches the output data string Dout.

With the receiver circuit 1a, the adjustment section 6b also generates the filter patterns FPb1 and FPb0 in order and compares each filter pattern with the output data string Dout. When the filter pattern FPb1 or FPb0 matches the output data string Dout, the adjustment section 6b adjusts the tap coefficient c2. The adjustment section 6b performs this operation in parallel with the operation performed by the adjustment section 6a. At timing t2 or t6 the filter pattern FPb1 matches the output data string Dout. At timing t4 or t8 the filter pattern FPb0 matches the output data string Dout.

With the receiver circuit 1, on the other hand, the adjustment section 5 repeatedly generates the filter patterns FP0 through FP3 in the order of, for example, the filter patterns FP3, FP2, FP1, and FP0 and compares each filter pattern with an output data string Dout. When the filter pattern FP0, FP1, FP2, or FP3 matches the output data string Dout, the adjustment section 5 adjusts the tap coefficients c1 and c2 in block in accordance with the relationships indicated in FIG. 4.

At timing t10 the filter pattern FP3 matches the output data string Dout. At timing t11 the filter pattern FP2 matches the output data string Dout. At timing t12 the filter pattern FP1 matches the output data string Dout. At timing t13 the filter pattern FP0 matches the output data string Dout.

All the filter patters are equal in length, so an expected value of the number of times each filter pattern matches an output data string Dout is the same.

With the receiver circuit 1a, the adjustment sections 6a and 6b adjust the tap coefficients c1 and c2, respectively, in parallel. One of the tap coefficients c1 and c2 is adjusted at the timing t1 through t8. As a result, each of the tap coefficients c1 and c2 is adjusted four times in time T.

With the receiver circuit 1, on the other hand, the adjustment section 5 adjusts both of the tap coefficients c1 and c2 at the timing t10 through t13. As a result, each of the tap coefficients c1 and c2 is adjusted four times in the time T. This is the same with the receiver circuit 1a.

As has been described, with the receiver circuit 1 according to the first embodiment the one adjustment section 5 adjusts the tap coefficients c1 and c2. In this case, the adjustment section 5 can make adjustments at approximately the same speed, compared with the case where the adjustment sections 6a and 6b adjust the tap coefficients c1 and c2, respectively, in parallel. That is to say, adjustment speed does not slow down.

The receiver circuit 1 according to the first embodiment which has been described includes the two-tap DFE 2. However, the number of taps included in a DFE is not limited to two. The same applies to a DFE including three or more taps. A receiver circuit according to a second embodiment described below includes a DFE including n taps.

Second Embodiment

Figure 8:
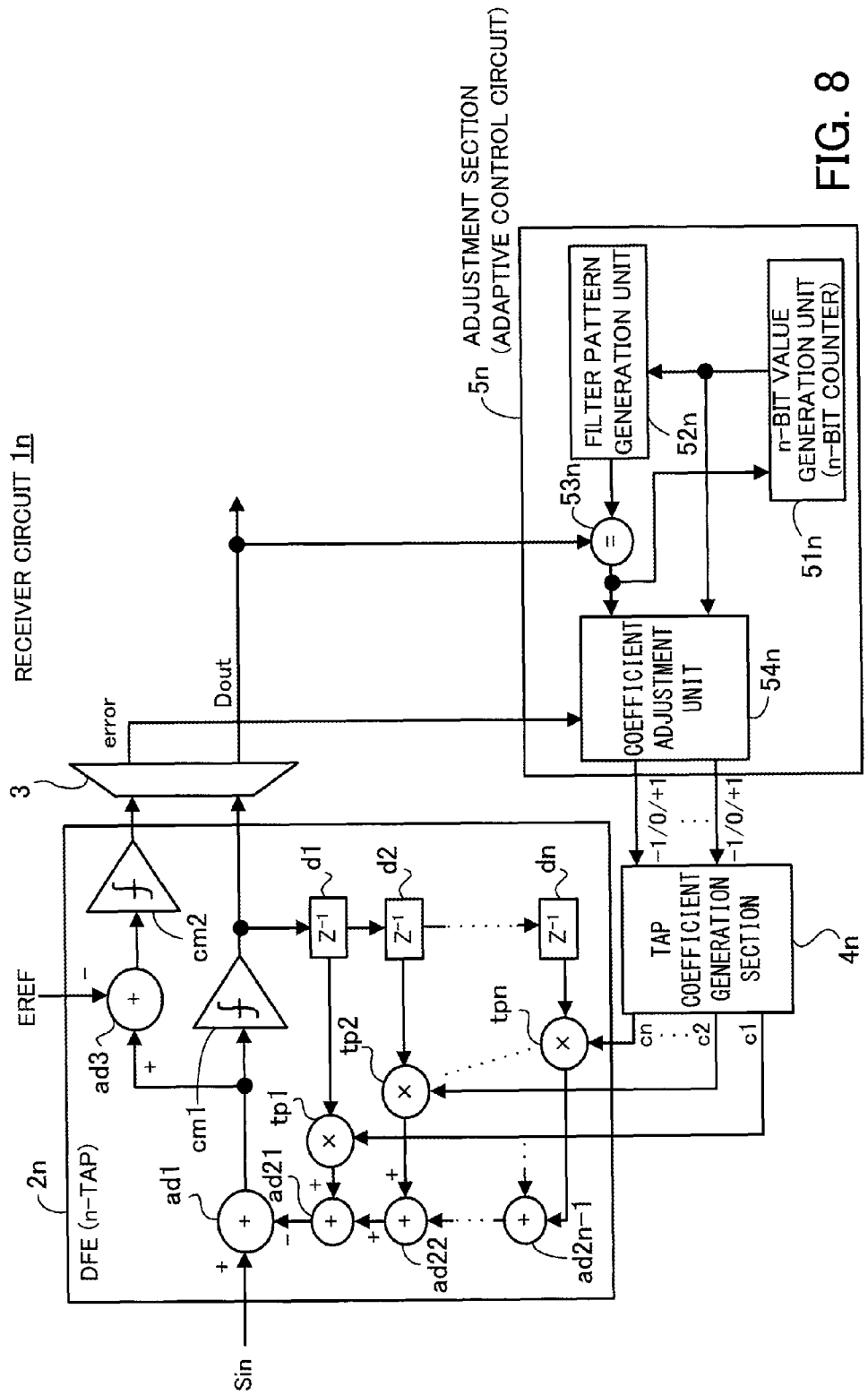
FIG. 8 illustrates an example of a receiver circuit according to a second embodiment.

FIG. 8 illustrates an example of a receiver circuit according to a second embodiment.

Components of a receiver circuit according to a second embodiment which are the same as those included in the receiver circuit 1 illustrated in FIG. 1 are marked with the same numerals.

A receiver circuit 1n according to a second embodiment includes an n-tap DFE 2n, a tap coefficient generation section 4n which generates n tap coefficients c1 through cn, and an adjustment section 5n which adjusts the tap coefficients c1 through cn.

The DFE 2n includes n taps (multipliers) tp1 through tpn and includes n delay circuits d1 through do and (n−1) adders ad21 through ad2(n−1) corresponding thereto.

The adjustment section (adaptive control circuit) 5n generates plural filter patterns for observation of an ISI amount in each of which values of n bits are changed, and compares each filter pattern generated with an output data string Dout from the DFE 2n. By using adjustment values (−1, 0, or +1, for example) corresponding to values of the n bits (variable bits) included in a filter pattern which matches the output data string Dout, the adjustment section 5n adjusts the tap coefficients c1 through cn set in the taps tp1 through tpn respectively.

The adjustment section 5n includes an n-bit value generation unit 51n, a filter pattern generation unit 52n, a determination unit 53n, and a coefficient adjustment unit 54n.

The n-bit value generation unit 51n generates an n-bit value according to the number (=n) of the taps included in the DFE 2n. Each time the determination unit 53n determines that a filter pattern generated by the filter pattern generation unit 52n matches an output data string Dout outputted from a demultiplexer 3, the n-bit value generation unit 51n outputs the next n-bit value.

The n-bit value generation unit 51n is, for example, an n-bit counter. For example, it is assumed that n=3 and that the n-bit value generation unit 51n is a 3-bit counter. In that case, the n-bit value generation unit 51n repeatedly outputs 3-bit values in the order of 000, 001, 010, 011, 100, 101, 110, 111, 000, and so on.

The filter pattern generation unit 52n generates plural filter patterns for observation of an ISI amount each including an n-bit value outputted from the n-bit value generation unit 51n. The filter pattern generation unit 52n generates $2^n$ different filter patterns according to the number (=n) of the taps. For example, if n=3, the filter pattern generation unit 52n generates $2^3$ different filter patterns.

The determination unit 53n determines whether or not a filter pattern generated by the filter pattern generation unit 52n matches an output data string Dout. For example, if the filter pattern generated by the filter pattern generation unit 52n matches the output data string Dout, then the determination unit 53n outputs 1. If the filter pattern generated by the filter pattern generation unit 52n does not match the output data string Dout, then the determination unit 53n outputs 0.

When a filter pattern generated by the filter pattern generation unit 52n matches an output data string Dout, the coefficient adjustment unit 54n adjusts the tap coefficients c1 through cn according to an error signal error and the above n-bit value.

FIG. 9 illustrates an example of adjusting a tap coefficient.

In the example of FIG. 9, of a filter pattern FP, bits $d_1$ through $d_n$ are variable bits generated by the n-bit value generation unit 51n and bits $d_0$ through $d_{-1}$ are fixed. The filter pattern FP is generated in plurality according to values C[n−1], C[n−2], . . . , and C[0] of the bits $d_1$ through $d_n$.

Furthermore, in the example of FIG. 9, tap coefficients c1 through cn are incremented by 1 when an error signal error is 1 and the values C[n−1] through C[0] of the corresponding bits $d_1$ through $d_n$ are 1. The tap coefficients c1 through cn are decremented by 1 when the error signal error is 1 and the values C[n−1] through C[0] of the corresponding bits $d_1$ through $d_n$ are 0. The tap coefficients c1 through cn are decremented by 1 when the error signal error is 0 and the values C[n−1] through C[0] of the corresponding bits $d_1$ through $d_n$ are 1. The tap coefficients c1 through cn are incremented by 1 when the error signal error is 0 and the values C[n−1] through C[0] of the corresponding bits $d_1$ through $d_n$ are 0.

When an output data string Dout matches no filter pattern (match=0), adjustment values of the tap coefficients c1 through cn are 0 and adjustment is not made.

Each time the output data string Dout matches a filter pattern (each time a determination result match becomes 1), the n-bit value generation unit 51n outputs the next n-bit value. As a result, the filter pattern is updated.

As has been described, with the n-tap receiver circuit 1n the n tap coefficients c1 through cn are also adjusted in block at the same time by the use of each filter pattern. As a result, there is no need to arrange adjustment sections (adjustment circuits) according to taps, and circuit area is reduced. That is to say, the same effect that is obtained by the receiver circuit 1 according to the first embodiment is achieved. As the number of taps increases, the effect of reducing circuit area heightens.

In the above description a 2-bit counter or an n-bit counter is taken as an example of the 2-bit value generation unit 51 illustrated in FIG. 1 or the n-bit value generation unit 51n illustrated in FIG. 8. However, the 2-bit value generation unit 51 or the n-bit value generation unit 51n is not limited to a counter. In order to make adjustment of a tap coefficient by each filter pattern function successfully, it is desirable to make each filter pattern appear with the same frequency. Each filter pattern can be generated with the same frequency by the use of a counter. However, a circuit which generates an n-bit random number value may be used as the n-bit value generation unit 51n.

Figure 10:
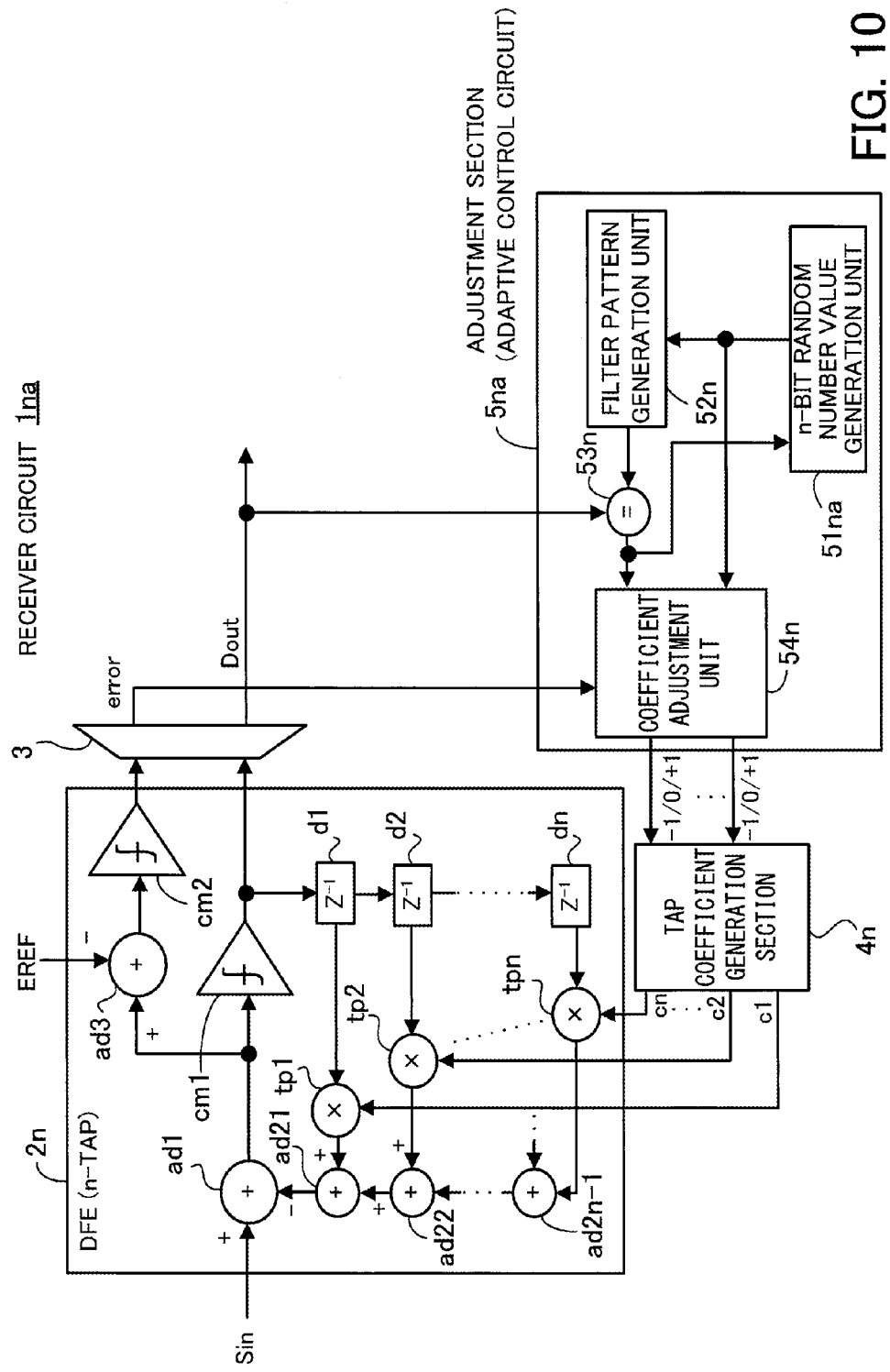
FIG. 10 illustrates a modification of a receiver circuit.

FIG. 10 illustrates a modification of a receiver circuit.

Components which are the same as those included in the receiver circuit 1n illustrated in FIG. 8 are marked with the same numerals.

An adjustment section (adaptive control circuit) 5na of a receiver circuit 1na includes an n-bit random number value generation circuit 51na as the n-bit value generation unit 51n illustrated in FIG. 8. The n-bit random number value generation circuit 51na is, for example, a pseudo random bit sequence (PRBS) circuit. A filter pattern generation unit 52n generates plural filter patterns FP like that illustrated in FIG. 9 on the basis of n-bit values generated by the n-bit random number value generation circuit 51na.

If the filter patterns FP are generated on the basis of n-bit random number values, each filter pattern by which n tap coefficients are adjusted in block is generated with approximately the same frequency.

An aspect of the receiver circuit according to the present invention has been described on the basis of the embodiments. However, these embodiments are simple examples and the present invention is not limited to the above description.

In the above description, for example, the DFE includes the taps for curbing the influence of ISI during a UI before the current UI. However, another DFE may be used. The same applies to a DFE to which taps are added for curbing the influence of ISI during a UI after the current UI. Each filter pattern includes variable bits by which tap coefficients are adjusted, so the tap coefficients are adjusted in block at the same time.

According to the disclosed receiver circuit, circuit area is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A receiver circuit comprising:
    an n-tap decision feedback equalization section which equalizes a received signal on the basis of a determination result of a signal that has been received and which outputs a determination result of the received signal after equalization, said n being a non-zero integer greater than or equal to 2; and
    an adaptive control circuit which generates a plurality of filter patterns for observation of an inter-symbol interference amount by changing values of n bits included in the plurality of filter patterns, which compares each of the plurality of filter patterns generated with an output data string corresponding to the determination result of the received signal after equalization, and which adjusts tap coefficients set for n taps included in the decision feedback equalization section on the basis of adjustment values corresponding to values of the n bits included in a filter pattern which matches the output data string.

2. The receiver circuit according to claim 1, wherein the adaptive control circuit adjusts the n tap coefficients at timing at which the output data string matches the filter pattern.

3. The receiver circuit according to claim 1, wherein:
    the adaptive control circuit includes an n-bit value generator which generates values of the n bits and a filter pattern generator which generates the plurality of filter patterns each including values of the n bits; and
    each time a filter pattern matches the output data string, the n-bit value generator updates values of the n bits.

4. The receiver circuit according to claim 3, wherein the n-bit value generator is an n-bit counter or a circuit which generates an n-bit random number value.

* * * * *